US005894329A

United States Patent [19]

Takeda et al.

[11] Patent Number: 5,894,329
[45] Date of Patent: Apr. 13, 1999

[54] DISPLAY CONTROL UNIT FOR CONVERTING A NON-INTERLACED IMAGE INTO AN INTERLACED IMAGE AND DISPLAYING THE CONVERTED IMAGE DATA

[75] Inventors: Yasumasa Takeda, Sagamihara; Akira Fukushima, Yamato; Masaki Kobayashi, Machida, all of Japan

[73] Assignee: International Business Machines Corporation, Armonk, N.Y.

[21] Appl. No.: 08/667,807

[22] Filed: Jun. 20, 1996

[51] Int. Cl.⁶ .................................................. H04N 7/01
[52] U.S. Cl. ............................ 348/446; 348/620; 348/625
[58] Field of Search ........................... 348/446, 447, 348/448, 458, 616, 619, 441, 450, 452, 625, 620

[56] References Cited

U.S. PATENT DOCUMENTS

| | | | |
|---|---|---|---|
| 4,620,225 | 10/1986 | Wendland et al. | 348/446 |
| 4,723,163 | 2/1988 | Skinner | 348/448 |
| 4,837,624 | 6/1989 | Heitmann et al. | 348/616 |
| 5,043,811 | 8/1991 | Yasuhiro | 348/458 |
| 5,400,082 | 3/1995 | Kamiya | 348/619 |
| 5,428,397 | 6/1995 | Lee et al. | 348/448 |
| 5,485,218 | 1/1996 | Aoyama et al. | 348/447 |
| 5,514,451 | 5/1996 | Clatanoff et al. | 348/446 |
| 5,532,751 | 7/1996 | Lui | 348/448 |

Primary Examiner—Victor R. Kostak
Attorney, Agent, or Firm—Scully, Scott, Murphy & Presser

[57] ABSTRACT

Disclosed are a display control unit and a control method therefor, for permitting images provided by a plurality of video image sources to overlie, whereby an area of an overlying image plane wherein an original video image source that is composed of lines and shade patterns is displayed by interpolating an original image, and whereby an area wherein an original video image source that is composed of video images is displayed non-interpolated without interpolation. According to the present invention, whether or not the interpolation on image data is required is determined for each pixel by employing a changed value of luminance for each pixel between scan lines, a color difference signal, and color data. Even when a computer image and a video image are displayed on the same screen at the same time, optimal display can be performed on the individual image planes.

2 Claims, 4 Drawing Sheets

Interlaced Scanning

Non-Interlaced Scanning

DISPLAY CONTROL UNIT FOR CONVERTING A NON-INTERLACED IMAGE INTO AN INTERLACED IMAGE AND DISPLAYING THE CONVERTED IMAGE DATA

BACKGROUND OF THE INVENTION

1. Field of the Invention

The present invention relates to a display control unit that can appropriately display both the screen output of a computer image and a video image (e.g., image conforming to NTSC/PAL on TV screen), and to a control method therefor; and in particular to a display control unit that overlays a computer image plane with a video image plane, and to a control method therefor. More specifically, the present invention pertains to a display control unit that can overlay a computer image plane with a video image plane while not causing flickering on the screen and losing the details of a video image, and to a control method therefor. In other words, the present invention relates to a display control unit that can display image data optimally even when non-interlaced image data are converted into interlaced image data, and to a control method therefor.

2. Discussion of the Prior Art

A display device displays an image by scanning image data onto a screen. The screen scan system is roughly divided into non-interlaced scanning and interlaced scanning.

The interlaced scanning is a method for drawing over only one of an odd numbered line field and an even numbered line field during one vertical scan period (i.e., scanning every other line) so that one screen plane is completed by performing two vertical scans. Non-interlaced scanning is a method that does not involve scanning every other line, but instead provides all the scan lines to be drawn at one time so that the drawing of one screen plane is completed during one vertical scan period. FIGS. 3(a) and (b) are schematic diagrams showing the interlaced scanning and the non-interlaced scanning that are performed on the screen. Commonly, there are 525 horizontal scan lines on one screen (480 valid scan lines except for those in a blanking interval) and vertical scanning is performed once every ⅟₆₀ second, i.e., at a speed of 60 Hz. Since non-interlaced scanning draws all the scan lines each time, the vertical positions of the drawn scan lines are identical on any screen. But as interlaced scanning draws alternately over an ODD screen, which consists of 262.5 (=525/2) odd numbered scan lines, and an EVEN screen, which consists of 262.5 even numbered scan lines, for each vertical scanning, the positions of the drawn scan lines in the vertical direction are shifted by one scan line between ODD screens and EVEN screens. If, in the interlaced scanning, image data carried by the adjacent scan lines differ greatly, flickering tends to occur between the EVEN screen and the ODD screen. Especially as the size of the display device becomes larger as with a large screen TV, the flickering is more annoying.

Although a non-interlaced display device and its controller are more expensive than those for interlaced scanning, they provide excellent image quality and little flickering on the screen, and reduce eyestrain. On the other hand, the interlaced scanning can reduce by half the quantity of data to be transferred and a display device employing the interlaced scanning is inexpensive. However, as is described above, flickering occurs on the interlaced screen and its image quality is degraded. Currently, computer display devices mainly employ non-interlaced scanning. HDTVs (High-Definition Television sets), that are characterized by a clear video image and high quality sound production (i.e., realism), also employ non-interlaced scanning. On the other hand, the standards for color television broadcasting (so-called NTSC system) that is prescribed by the NTSC (National Television System Committee) still employ interlaced scanning, because an interlaced display device is inexpensive and most of the home television sets that are already in wide spread use employ interlaced scanning.

There has appeared a need, for the purpose of presentations in large conference rooms or other purposes, for displaying the non-interlaced screen of personal computers on home television sets with large screens by the NTSC/PAL format (i.e., interlaced scanning at 60 Hz or 50 Hz). When a computer image is displayed, non-interpolated, on a home television set (especially a large-screen television set), however, flickering of the image tends to occur on the screen, as compared with video images produced by a television set, a video camera, and a VTR. This is because a computer image is mainly constituted by lines and shade patterns and the difference in image data is great between adjacent scan lines.

To overcome such a shortcoming that occurs when a computer image is displayed by interlaced scanning, conventionally, an interpolation process is performed in which image data is averaged between sequential scan lines. FIG. 4 is a specific diagram illustrating a circuit for averaging image data between scan lines. In FIG. 4, a line buffer 1 is employed to temporarily store image data sequentially and to output it after a predetermined delay time has elapsed. In order to average the image data between sequential scan lines, the line buffer 1 must have a large size enough to store image data for at least a single scan line. For example, when there are 640 pixels per line, to accumulate image data with the YUV 4:2:2: format (Y is a luminance component and U/V is a color difference component), which is a common digital video format, the line buffer 1 must have a size of at least 16 bits×640, i.e., a size of about 1 Kbyte. An averaging circuit 2 averages two input signals. That is, the averaging circuit 2 acquires average value from the image data of pixels on a current scan line and that of the corresponding pixels on the previous scan line stored in the line buffer 1, and sequentially outputs the average value to a display section (e.g., a TV). Then the display section actually performs the drawing. The method for interpolating the image data between the scan lines is very effective in reducing the flickering between scan lines, even though the method degrades the vertical resolution. The degradation of the vertical resolution can be solved by a cooperative operation involving software (i.e., by scaling up displayed characters in computer image).

However, current multi-media type personal computers frequently overlay a normal computer image that consists of lines and shade patterns with a video image, such as motion picture and still picture provided by CD-ROM or HDD. Unlike computer images, it is not necessary to perform interpolation (see FIG. 4) for video images, as details that are characteristic of video images will be lost and the image quality will be deteriorated. Since there is only a little difference between adjacent scan lines in the image data of video image (i.e., the image information of video image is smoothly changed) unlike computer image, almost no effect is obtained by using interpolation to reduce flickering. On the contrary, the reproduction of an original image may be lost due to deterioration of the vertical resolution. However, if interpolation is not performed, the flickering in the computer image plane cannot be removed.

If interpolation is performed either manually or automatically when the total displayed plane is a video image plane, the above described shortcomings can be easily resolved. But, methods that uniformly handle the total plane can not optimize the screen including overlaid video image plane. This is because a video image plane, which is provided by current multi-media type personal computers may have unspecified size and overlie unspecified position among a computer image plane.

In addition, the necessary of the line buffer 1 that has a large size of about 1 Kbyte is a relatively great load for the design and the manufacture of an electronic circuit. A computer image itself originally does not have delicate changes in luminance and color on the screen. Therefore, as to a computer image, even if an information quantity per pixel for the line buffer 1 is reduced by throwing away the lower bits, the quality of the image is little deteriorated. In the computer graphics field, it is well known that a line buffer can be scaled down by omitting the lower bits. However, if the lower bits of a video image are also thrown away, a troublesome condition, such as the loss of the details, inevitably occurs. It is because delicate luminance changes and fine color changes are important for video image. For example, the omission of the lower bits of a Y (luminance) signal causes flickering on the screen; and the omission of the lower bits of a U/V (color difference) signal causes a change in the color phases. That is, the reduction in flickering caused by decreasing the size of the line buffer 1 has a trade-off relationship with the deterioration of the image quality.

SUMMARY OF THE INVENTION

It is one object of the present invention to provide an excellent display control unit that can appropriately display both the screen output of a computer and a video image (e.g., an NTSC/PAL based TV output), and to a control method therefor.

It is another object of the present invention to provide an excellent display control unit, by which a video image in an unspecified size overlies an unspecified position in a computer graphics image plane, and to a control method therefor.

It is an additional object of the present invention to provide a display control unit that can overlay a computer graphics image plane with a video image plane without causing flickering on the screen and without losing the details of the video image, and to a control method therefor.

It is a further object of the present invention to provide a display control unit that can convert non-interlaced image data, which is obtained from a plurality of video image sources, into interlaced image data and that can employ that data to display high quality images, and to a control method therefor.

It is still another object of the present invention to provide a relatively inexpensive display control unit that can convert non-interlaced image data, which are obtained from a plurality of video image sources, into interlaced image data and that can employ that data to display high quality images, and to a control method therefor.

To achieve the above objects, according to a first aspect of the present invention, provided are a display control unit for converting a non-interlaced image into an interlaced image and displaying the converted data, and a control method therefor comprises: means/step for comparing image data in a current scan line with image data at corresponding positions in a previous scan line; means/step, within an interval on the current scan line where the comparison result is equal to or greater than a predetermined threshold value, for interpolating the image data of the current scan line, and displaying the interpolated image data on the current scan line; and means/step, within an interval on the current scan line where the comparison result is less than the predetermined threshold value, for displaying the non-interpolated image data of the current scan line on the current scan line.

According to a second aspect of the present invention, provided are a display control unit for converting a non-interlaced image into an interlaced image and displaying the converted data, and a control method therefor, comprises: means/step for comparing image data in a current scan line with image data at corresponding positions in a previous scan line; means/step, within an interval on the current scan line where the comparison result is equal to or greater than a predetermined threshold value, for averaging the image data both in the current scan line and in the previous scan line, and displaying the averaged image data on the current scan line; and means/step, within an interval on the current scan line where the comparison result is less than the predetermined threshold value, for displaying the non-interpolated image data of the current scan line on the current scan line.

According to a third aspect of the present invention, provided are a display control unit for overlaying images provided by a plurality of video image sources, and a control method therefor comprises: means/step, within an area where an original video image source is composed of lines and shade patterns, for interpolating an original image and displaying interpolated image; and means/step, within an area where an original video image source that is composed of video images, for displaying non-interpolated image.

According to a fourth aspect of the present invention, a display control unit for optimizing image data, and a control method therefor comprises: (a) a line buffer/buffering step for temporarily storing image data for one scan line and for outputting the image data with a delay time of one scan line in order; (b) averaging means/step for averaging original image data of pixels in a current scan line, and image data of the corresponding pixels in a previous scan lines outputted by the line buffer/buffering step; (c) differential means/step for acquiring a difference between the original image data of the pixel in the current scan lines, and the image data of the corresponding pixels in the previous scan lines outputted by the line buffer/buffering step; (d) comparison means/step for comparing the difference acquired by the differential means/step with a predetermined threshold value; and (e) selection means/step for inputting the original image data of the pixels in the current scan lines and image data of the pixels averaged by the averaging means/step, and for outputting either the averaged image data or the non-interpolated original image data, in accordance with a comparison result obtained by the comparison means/step.

According to a fifth aspect of the present invention, a display control unit for optimizing image data in which each pixel is composed of n bits (n being a positive integer) and for displaying the optimized image data on each pixel, and a control method therefor comprises: (a) a line buffer/buffering step for temporarily storing a multiple of upper k bits (k being an integer that satisfies $0<k\leq n$) of image data among a single scan line and for outputting the upper k bits with a delay time for one scan line; (b) averaging means/step for averaging the upper k bits of original image data of the pixels in a current scan line, and image data of the corresponding pixels in a previous scan lines outputted by the line buffer/buffering step; (c) differential means/step for acquiring a difference between the upper k bits of the original image data of the pixels in the current scan line, and the image data of the corresponding pixels in the previous scan line outputted by the line buffer/buffering step; (d) comparison means/step for comparing the difference with a predetermined threshold value; and (e) selection means/step for inputting the original image data of the pixels in the current scan line and image data of the pixels averaged by the averaging means/step, and for outputting either the averaged image data or the non-interpolated original image data, in accordance with a comparison result obtained by the comparison means/step.

According to the display control unit and the control method therefor of the first through the fifth aspect of the present invention, whether or not the interpolation on image data is required is determined for each pixel by employing a changed value of luminance, a color difference signal, and color data for each pixel between scan lines. Even when a computer image and a video image are displayed on the same screen at the same time, optimal display can be performed on the individual image planes.

According to the present invention, even when a video image in an unspecified size overlies an unspecified position in the screen, no flickering occurs in a computer image plane and the details of the video image are not lost.

In the present invention, the interpolation on image data is performed to acquire an average value between current scan lines and previous scan lines. A line buffer, therefore, is required to temporarily store image data for the previous scan lines. According to the display control unit and the control method therefor of the fifth aspect of the present invention, only the several upper bits of image data for each pixel are employed to determine whether or not the interpolation is needed and to perform the interpolation, so that the size of the line buffer can be reduced. Taking into consideration the differences between the characteristics of a computer image and those of a video image, sufficient accuracy can be maintained by using only several upper bits to determine the necessity for interpolation.

BRIEF DESCRIPTION OF THE DRAWINGS

Preferred embodiments of the present invention will now be described, by way of example only, with reference to the accompanying drawings, in which.

DETAILED DESCRIPTION OF THE INVENTION

Figure 1:
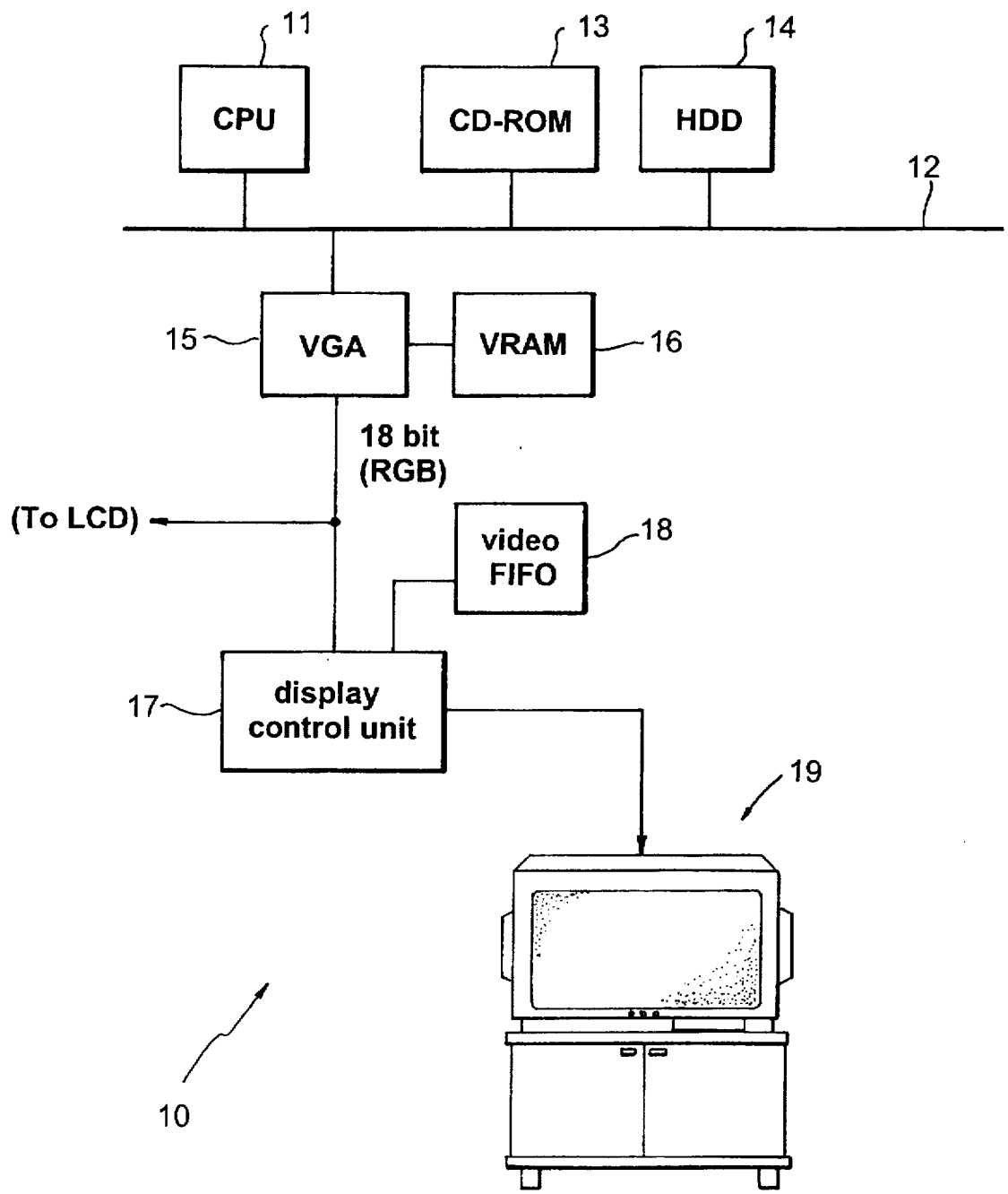
FIG. 1 is a schematic diagram illustrating the peripheral hardware arrangement for a display device of a personal computer 10 according to one embodiment of the present invention.

One embodiment of the present invention will now be explained while referring to the drawings.

A. Arrangement of personal computer 10

FIG. 1 is a schematic diagram illustrating the peripheral hardware arrangement for the display device of a personal computer (PC) 10 according to one embodiment of the present invention. There are many other devices and interface circuits that constitute the PC 10 in addition to those shown in FIG. 1; however, since they do not relate to the present invention, no explanation for them will be given.

In FIG. 1, a CPU 11 is a unit for executing various application programs under the control of an operating system (OS) and may be, for example, a DX4 that is sold by Intel Corp. The CPU 11 can communicate with the other devices via an I/O bus 12. The I/O bus 12 is a common signal transfer path, which includes an address bus, a data bus and a control bus, and can be, for example, a VL (VESA Local) bus as is prescribed by the VESA (Video Electronics Standards Association). To the I/O bus 12 are connected storage devices, such as a CD-ROM drive 13 and a hard disk drive (HDD) 14 (the storage devices 13 and 14 may be connected via another bus and another interface circuit (none of them shown) in addition to being directly connected to the I/O bus 12). By loading a disk that conforms to CD-I (Compact Disk Interactive) format or CD-ROM XA (CD ROM Extended Architecture) format into the CD-ROM drive 13, the CD-ROM drive 13 can provide video image data application programs executed by the CPU 11. When the video image data provided by a TV, a video camera, and a VTR (neither of them shown) are made into a file and stored in advance on the HDD 14, the HDD 14 can later supply the video image data to application programs.

A VGA (Video Graphics Array) 15 is a graphic controller that receives drawing commands from the CPU 11 and performs drawing process. The VGA 15 temporarily writes drawing data into a VRAM (video RAM) 16, and converts the image data, which are consonant with the contents of the VRAM 16, into RGB (Red, Green and Blue) signals of, for example, 18 bits, and outputs the signals. As is explained in the above section of Discussion of the Prior Art, at the present time when multimedia personal computers are being widely used, there may be image planes that include video images of unspecified size and unspecified position as compared to normal computer images which are constituted by lines and shade patterns. Video image can be provided by the CD-ROM drive 13 or the HDD 14. In general, RGB signals that are outputted by the VGA 15 conform to non-interlaced scanning, as is well known by one having ordinary skill in the art.

The RGB signals transmitted from the VGA 15 may be directly outputted to a liquid crystal display device (LCD), or to a CRT (Cathode Ray Tube) display device (not shown) after converted into analog signals. In this embodiment, image data for each pixel in the scan line is optimized in the display control unit 17 so as to be adjusted for display on the large screen TV 19. As is described in [Description of the Background], image data between the scan lines of a computer image change drastically, and interpolation is required before the conversion to interlaced scanning. The image data between the scan lines of a video image tend to change gradually and the performance of interpolation degrades the reproduction of an original image. The display control unit 17 therefore employs the changed values of luminance and color difference signal between scan lines for each pixel, to determine whether or not the interpolation of image data is necessary. Therefore, image data that have been averaged and interpolated by using image data on the previous scan lines are outputted to the pixel that concern a computer image. On the other hand, the original image data are outputted to the pixels that concern a video image.

Interlaced scanning is not performed for the image data outputted by the display control unit 17, and all the image data are once written in a video FIFO 18. The video FIFO 18 is a screen buffer for a so-called first-in first-out system, and is employed to adjust the timing.

In this embodiment, an interlaced home TV that conforms to the NTSC/PAL system, i.e. that is driven at 60 Hz or 50 Hz, is assumed to be the large screen TV 19. The large screen TV 19 alternately draws, for each vertical scan period, either the odd numbered field or the even numbered field of image data stored in the video FIFO 18.

According to this embodiment, since the display control unit 17 is included, even when a computer image and a video image are displayed at the same time on a single screen, no flickering occurs in the computer image plane and the details of the video image are not lost, thus ensuring that an optimal display of the image planes can be provided. The following division B should be referred to for the details of the display control unit 17.

B. Internal arrangement of display control unit 17

Figure 2:
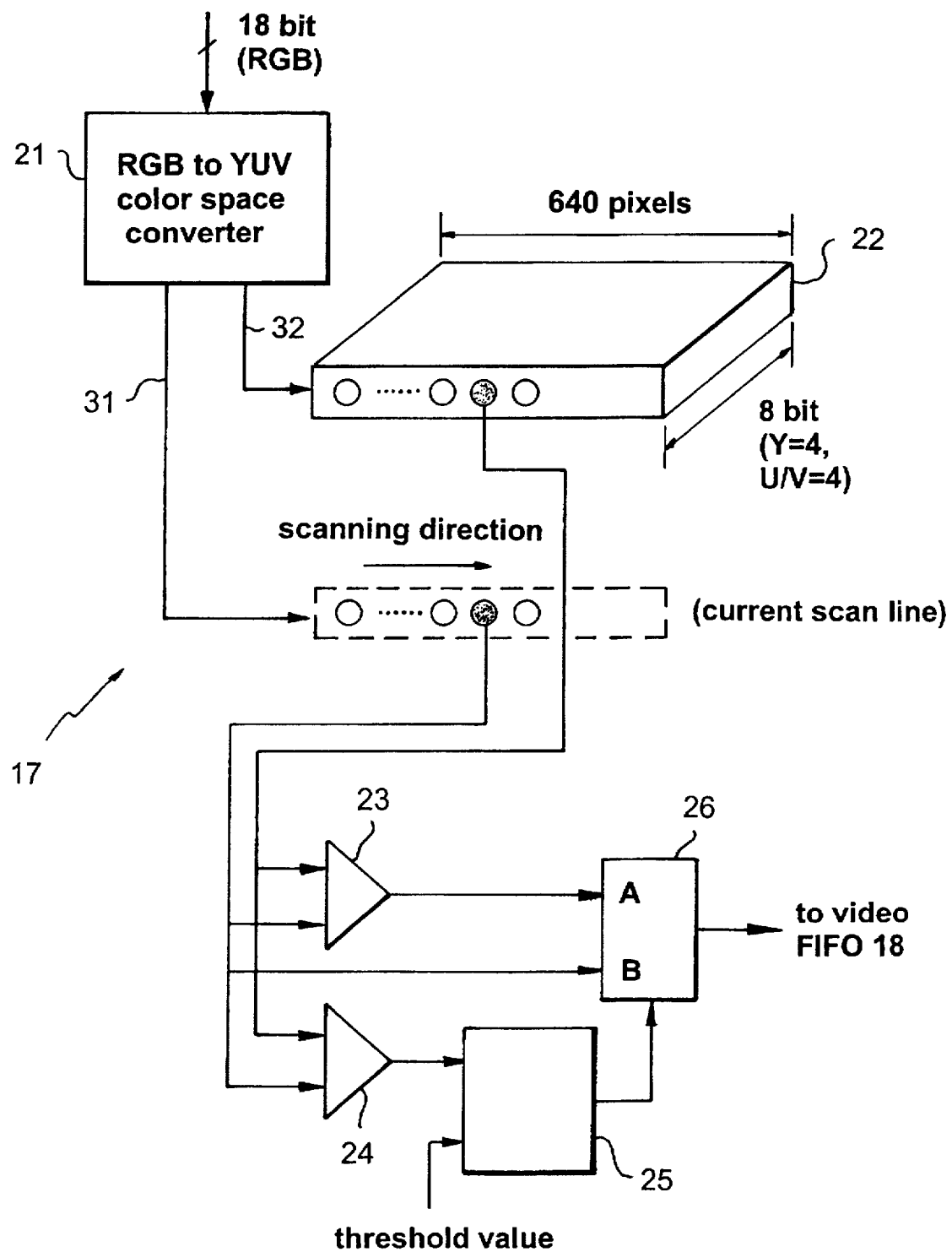
FIG. 2 is a diagram illustrating the internal arrangement of a display control unit 18, one of the hardware components of the personal computer 10.
Figure 3A:
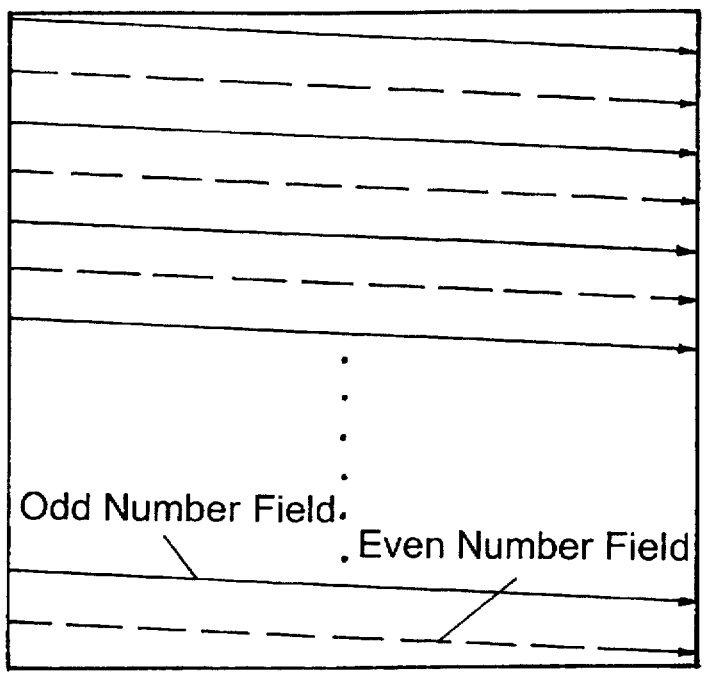
FIGS. 3(a) and (b) are schematic diagrams illustrating interlaced scanning and non-interlaced scanning on a screen.
Figure 3B:
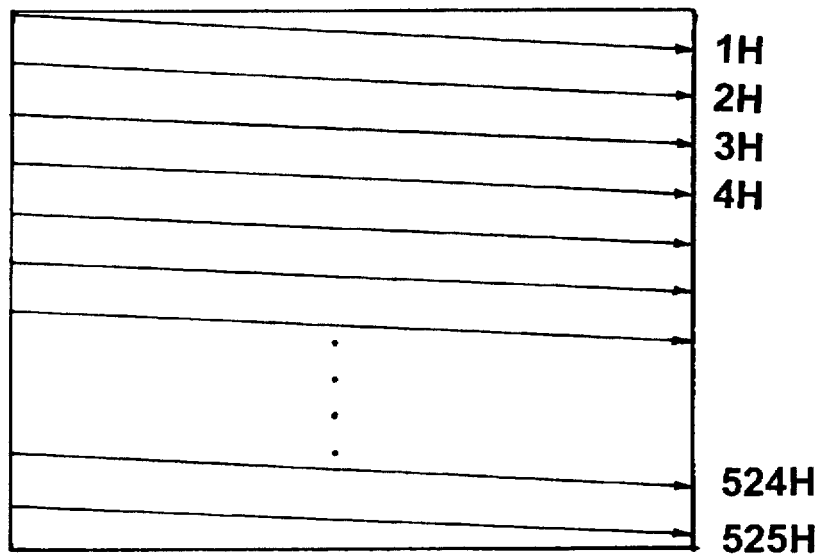
Figure 4:
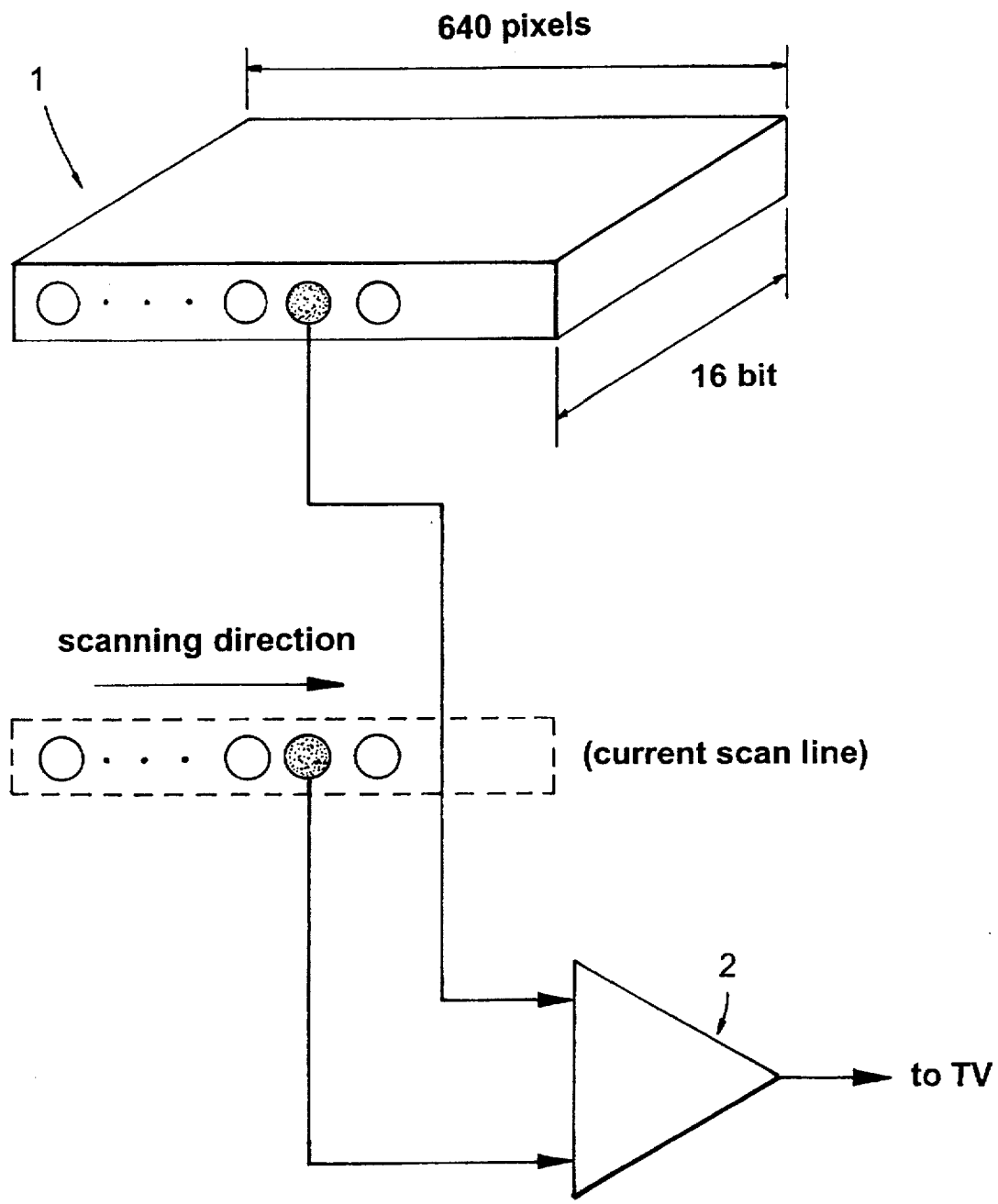
FIG. 4 is a specific diagram illustrating a circuit for averaging image data in scan lines.

FIG. 2 is a specific diagram illustrating the internal arrangement of the display control unit 17.

An RGB output signal of 18 bits from the VGA 15 is converted into a 16-bit YUV signal by a color/space converter 21. The YUV signal is composed of a luminance component (Y) and a color difference component (U/V), with a ratio of Y:U:V=4:2:2. The conversion of the RGB signal into the YUV signal means only that two bits of color data are reduced based on the general rule that "human beings are less sensitive to color difference than to luminance". The conversion from the RGB format to the YUV format itself does not relate to the subject of the present invention. It should be noted that the present invention can be realized even by using a signal in the RGB format, not in the YUV format as described later.

The image data in the scan lines, for which the format conversion has been performed by the color/space converter 21, are outputted as image data for current scan lines via an output line 31, and are sequentially written into a line buffer 22 via an output line 32.

The line buffer 22 temporarily stores image data for a single horizontal scan line, and outputs the data as image data for previous scan lines after a delay time for one horizontal scanning process has elapsed. The line buffer 22 may have a sufficient size (about 1 Kbyte as the total size) enough to accumulate a data quantity (i.e., 16 bits) for each pixel. In this embodiment, however, the line buffer 22 stores only the upper eight bits of image data and throws away the lower bits according to the following empirical rules: (1) For a computer image, the difference between the image data in the adjacent scan lines is great, and the image quality of interpolated image data can be satisfactorily maintained even when only upper bits are employed for an averaging process (which will be described later). (2) As compared with a computer image, the image data for a video image on the adjacent scan lines are gradually changed. By referring to only the upper bits, it can be determined whether each pixel belongs to a computer image or to a video image. For the allocation of the upper eight bits, for example, the upper four bits of each Y and U/V component may be adopted, or the upper five bits of the Y component and the upper three bits of the U/V component may be adopted (as already known, the U/V is adopted in a time sharing manner). When the display control unit 17 is to be designed and manufactured by using the ASIC (Application Specific Integrated Circuit) technology, the mounting area required for the line buffer 22 can not be ignored, because its size is relatively large and the chip cost rises according to the gate size. The line buffer 22 with relatively small size is therefore advantageous for makers of IC chips and PCs.

An averaging circuit 23 sequentially fetches, from the color/space converter 21 along the scanning direction, the upper eight bits of the image data in the current scan line for each pixel. The averaging circuit 23 also fetches, from the line buffer 22, the upper eight bits of image data for each corresponding pixel on the previous scan line. An average value is acquired from the two sets of fetched data and is outputted as interpolated image data to a selector 26.

A differential circuit 24 sequentially fetches, from the color/space converter 21 along the scanning direction, the upper eight bits of the image data in the current scan line for each pixel. The differential circuit 24 also fetches, from the line buffer 22, the upper eight bits of each corresponding pixel in the previous scan line. The difference between the two sets of fetched data is outputted to a comparator 25.

The comparator 25 compares the output of the differential circuit 24 with a predetermined threshold value. Within an interval, among the current scan line, where the received output value of the differential circuit 24 is beyond the threshold value, the comparator 25 determines that the current pixel belongs to a computer image and that interpolation of the image data is necessary, and outputs the decision. Within an interval, among the current scan line, where the received output is below the threshold value, the comparator 25 determines that the current pixel belongs to a video image and that no interpolation of image data is required, and outputs the decision. This operation by the comparator 25 is based on the general rule that "the image data for a computer image greatly differ between adjacent scan lines" (previously described). Only the upper eight bits of the total image data are employed to determine whether or not the interpolation is necessary. By taking into consideration the difference in the characteristics of a computer image and a video image, a sufficient accuracy of determination can be maintained.

The selector 26 directly receives the original image data for a current pixel in a current scan line across the output line 31 as well as the image data interpolated by the averaging circuit 23. The selector 26 selects one of the two input data items and outputs it to the video FIFO 18 in response to the decision by the comparator 25. More specifically, the selector 26 outputs the interpolated image data when the output of the comparator 25 is active, and output the original image data of a current pixel when the output of the comparator 25 is inactive.

When the comparator 25 determines that the current pixel concerns a video image, the image data outputted by the color/space converter 21 are passed through, and are written into the video FIFO 18 directly so that the interpolated data is not used. Even if the line buffer 22 has a small size, the deterioration of the details of the video image is not induced. This is because the interpolation is not performed on image data of a video image.

The display control unit 17 may be implemented into a part of a video capture controller chip. The video capture controller is employed to capture video signals and audio signals from an external video device as computer data conforming to the OS file format. As long as the line buffer 22 has a small size, as is described above, everything can easily be mounted on a single chip.

The present invention has been described in detail while referring to a specific embodiment. However, it should be obvious to one having ordinary skill in the art that various modifications or revisions of the embodiment are possible within the scope of the present invention. In the embodiment in this specification, personal computers have been employed for explanation. The present invention can be employed for other portable information processing apparatuses (e.g., work station terminals, word processors, and other types of OA devices). That is, although the present invention has been disclosed by using an example, it should not be limited to that example. To fully understand the subject of the present invention, the claims should be referred to.

As is described above in detail, according to the display control unit and the control method of the present invention, whether or not the interpolation on image data is required is determined for each pixel by employing a changed value of luminance for each pixel between scan lines, a color difference signal, and color data. Even when a computer image and a video image are displayed on the same screen at the same time, optimal display can be performed on the individual image planes.

Further, according to the present invention, even when a video image in an unspecified size overlies an unspecified position in the screen, no flickering occurs in a computer image plane and the details of the video image are not lost.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new and desire to secure by letters patent is:

1. A display control unit for optimizing image data in which each pixel is composed of n bits (n being a positive integer) and displaying the optimized image data on each pixel, comprising:

(a) a line buffer for temporarily storing a multiple of upper k bits (k being an integer that satisfies 0<k≦n) of image data among a single scan line and for outputting the upper k bits with a delay time for one scan line;

(b) averaging means for averaging the upper k bits of original image data of the pixels in a current scan line, and image data of the corresponding pixels in a previous scan lines outputted by said line buffer;

(c) differential means for acquiring a difference between the upper k bits of the original image data of the pixels in the current scan line, and the image data of the corresponding pixels in the previous scan line outputted by said line buffer;

(d) comparison means for comparing the difference with a predetermined threshold value; and (e) selection means for inputting the original image data of the pixels in the current scan line and image data of the pixels averaged by said averaging means, and for outputting either the averaged image data or the non-interpolated original image data, in accordance with a comparison result obtained by said comparison means.

2. A control method, for a display control unit that optimizes image data in which each pixel is composed of n bits (n being a positive integer) and for displaying the optimized image data on each pixel, comprising:

(a) buffering step of temporarily storing a multiple of upper k bits (k being an integer that satisfies 0<k≦n) of image data among a single scan line, and outputting the upper k bits with a delay time for one scan line;

(b) averaging step of averaging the upper k bits of original image data of the pixels in a current scan line, and image data of the corresponding pixels in a previous scan lines outputted by said buffering step;

(c) differential step of acquiring a difference between the upper k bits of the original image data of the pixels in the current scan line, and the image data of the corresponding pixels in the previous scan line outputted by said buffering step;

(d) comparison step for comparing the difference with a predetermined threshold value; and (e) selection step of inputting the original image data of the pixels in the current scan line and image data of the pixels averaged by said averaging step, and outputting either the averaged image data or the non-interpolated original image data, in accordance with a comparison result obtained by said comparison step.

* * * * *